United States Patent
Aoki et al.

(10) Patent No.: US 11,241,684 B2
(45) Date of Patent: Feb. 8, 2022

(54) REACTION METHOD

(71) Applicant: Konica Minolta, Inc., Tokyo (JP)

(72) Inventors: Youichi Aoki, Toda (JP); Yuuya Shouji, Hachioji (JP); Tetsuya Noda, Hino (JP); Atsuo Iwashita, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 113 days.

(21) Appl. No.: 16/754,217

(22) PCT Filed: Oct. 15, 2018

(86) PCT No.: PCT/JP2018/038299
§ 371 (c)(1),
(2) Date: Apr. 7, 2020

(87) PCT Pub. No.: WO2019/078152
PCT Pub. Date: Apr. 25, 2019

(65) Prior Publication Data
US 2020/0269231 A1 Aug. 27, 2020

(30) Foreign Application Priority Data
Oct. 16, 2017 (JP) .............................. JP2017-200001

(51) Int. Cl.
*B01L 3/02* (2006.01)

(52) U.S. Cl.
CPC ......... *B01L 3/021* (2013.01); *B01L 2200/147* (2013.01); *B01L 2300/1805* (2013.01)

(58) Field of Classification Search
CPC ....... B01L 2200/147; B01L 2300/1827; B01L 3/021; B01L 7/00; B01L 2300/1805; B01L 3/0275; G01N 1/00; G01N 35/10
See application file for complete search history.

(56) References Cited

U.S. PATENT DOCUMENTS 7,006,143 B1 * 2/2006 Silverbrook ....... H04N 1/00132
  348/373
7,452,414 B1 * 11/2008 Jung ................... B41J 2/17513
  106/31.46

(Continued)

FOREIGN PATENT DOCUMENTS

JP  2006-275820 A  10/2006
WO  2017/082069 A1  5/2017

OTHER PUBLICATIONS

PCT, International Search Report for the corresponding application No. PCT/JP2018/038299, dated Nov. 12, 2018, with English translation.

*Primary Examiner* — Shogo Sasaki
(74) *Attorney, Agent, or Firm* — Lucas & Mercanti, LLP

(57) ABSTRACT

Disclosed is a reaction method that includes a reaction process using a pipette tip to allow substances to cause a reaction, the method including: providing a heater for heating the pipette tip in accordance with a preset temperature; attaching the pipette tip to a pipette nozzle and heating the pipette tip by a first preset temperature; when a period of heating by the first preset temperature exceeds a preset period, switching an output of the heater from the first preset temperature to a lower second preset temperature; detecting a distal end position of the pipette tip at or after the switching; and executing the reaction process while controlling the distal end position of the pipette tip with reference to the detected distal end position, in which the temperature of the pipette tip is kept by the second preset temperature at least until operation of the pipette tip.

5 Claims, 8 Drawing Sheets

(56) References Cited

U.S. PATENT DOCUMENTS

| | | | |
|---|---|---|---|
| 2006/0109327 A1* | 5/2006 | Diamond | B41J 2/17593 |
| | | | 347/102 |
| 2013/0078733 A1* | 3/2013 | Holmes | G01N 35/1072 |
| | | | 436/174 |
| 2019/0232297 A1* | 8/2019 | Daviso | B01L 3/54 |
| 2020/0018775 A1* | 1/2020 | Fujii | B01L 7/00 |
| 2020/0124531 A1* | 4/2020 | Noda | G01N 33/54373 |
| 2020/0271593 A1* | 8/2020 | Noda | G01N 21/648 |
| 2020/0363438 A1* | 11/2020 | Glezer | G01N 35/00732 |
| 2021/0025908 A1* | 1/2021 | Osawa | B01L 3/021 |
| 2021/0237048 A1* | 8/2021 | Amorese | B01L 3/0275 |
| 2021/0268489 A1* | 9/2021 | Brodsky | B01L 7/52 |

\* cited by examiner

REACTION METHOD

CROSS REFERENCE TO RELATED APPLICATION

This Application is a 371 of PCT/JP2018/038299 filed on Oct. 15, 2018 which, in turn, claimed the priority of Japanese Patent Application No. 2017-200001 filed on Oct. 16, 2017, both applications are incorporated herein by reference.

TECHNICAL FIELD

The present invention relates to a reaction method that involves a reaction process of allowing two or more substances to cause a reaction by using a pipette tip for drawing and ejecting liquid attached to a pipette nozzle.

BACKGROUND ART

As described in Patent Documents 1 and 2, a pipette nozzle and a pipette tip attached to the tip thereof are used for highly sensitive and quantitative detection of a trace amount of target substance such as a protein or a DNA. In order to detect a trace amount of the target substance quantitatively with high sensitivity, it is necessary to accurately supply a sample and a labeling liquid to a reaction site and remove them from the reaction site. Generally, a pipette tip is used for supplying and removing a sample and a labeling liquid.

In a method of supplying and removing a liquid described in Patent Document 1, the distal end position of a resin pipette tip attached to a pipette nozzle is detected by a photosensor. Then, the position of the pipette nozzle is adjusted based on the information on the distal end position of the pipette tip, which allows accurate supply and removal of the liquid.

However, after the pipette tip is attached to the pipette nozzle and the distal end position of the pipette tip is detected and before the reaction process is started, if the pipette tip undergoes a temperature change, the pipette tip expands so that the distal end of the pipette tip becomes lower than the level at the time of the detection. As a result, the distal end of the pipette tip gets too close to the bottom surface of the flow path in feeding a liquid, and the liquid cannot be fed correctly. Depending on the degree of expansion, the distal end of the pipette tip is blocked by the bottom surface of the flow path, and draw or ejection cannot be performed. This causes a problem that development of the reaction and measurement of the amount of reaction cannot be performed correctly.

To cope with the problem that the distal end position is deviated due to thermal expansion of a pipette tip, a method described in Patent Document 2 involves correcting the distal end position of the pipette tip on the basis of the estimated temperature at the time of the reaction process or on the basis of the temperature of the pipette tip measured at the time of the reaction process, so as to control the distal end position of the pipette tip with respect to the bottom surface a flow path at the time of feeding or suctioning a liquid.

CITATION LIST

Patent Literature

Patent Document 1: JP-A-2006-275820
Patent Document 2: WO-A-2017/082069

SUMMARY

Technical Problem

However, a problem with the method described in Patent Document 2 is that when the distal end position of the pipette is corrected based on the estimated temperature at the time of the reaction process, a deviation may occur depending on ambient temperature. When the distal end position of the pipette is corrected based on the temperature of the pipette tip measured at the time of the reaction process, it is necessary to provide a means for measuring the temperature of the pipette tip. In addition, it is complicated to correct and control the distal end position the pipette tip during the reaction process regardless of whether the control is based on the estimated temperature or the measured temperature.

The present invention has been made in view of the above-described problems in the prior art, and it is an object of the present invention to provide a reaction method capable of accurately and quickly detecting before a reaction process the distal end position of a pipette tip during the reaction process.

Solution to Problem

The invention of claim 1 is a reaction method that includes a reaction process of supplying and removing a liquid to and from a reaction site multiple times by using a pipette tip for drawing and ejecting a liquid attached to a pipette nozzle so as to allow two or more substances to cause a reaction, the method comprising:

providing a heater for heating and keeping the pipette tip at a temperature in accordance with a preset temperature in a position that is close to an attaching position of the pipette tip ahead of a tip of the pipette nozzle, attaching the pipette tip to the pipette nozzle and heating the pipette tip by a first preset temperature by the heater;

when a period of heating the pipette tip by the first preset temperature exceeds a preset period, switching an output of the heater from the first preset temperature to a second preset temperature that is lower than the first preset temperature so as to keep a temperature of the pipette tip by the second preset temperature;

detecting a distal end position of the pipette tip in an axial direction of the pipette nozzle at or after the switching to the second preset temperature; and executing the reaction process while controlling the distal end position of the pipette tip by controlling movement of the pipette nozzle in the axial direction with reference to the detected distal end position, in which the temperature of the pipette tip is kept by the second preset temperature by the heater at least until operation of the pipette tip in the reaction process.

The invention of claim 2 is the reaction method according to claim 1, wherein the pipette tip is made of a resin, and a linear expansion coefficient of the pipette tip is equal to or greater than $5.8 \times 10^{-5}/°$ C.

The invention of claim 3 is the reaction method according to claim 1 or 2, wherein the first preset temperature is 10° C. to 15° C. higher than the second preset temperature.

The present invention of claim 4 is the reaction method according to claim 1 or 2 or 3, wherein the preset period is from 5 s to 10 s.

The present invention of claim 5 is the reaction method according to any one of claims 1 to 4, wherein the distal end position of the pipette tip is detected 10 s to 20 s after the switching to the second preset temperature, and the reaction process is executed while controlling the distal end position of the pipette tip by controlling movement of the pipette nozzle with reference to the detected distal end position.

Advantageous Effects of Invention

According to the present invention, the distal end position of the pipette tip is detected before the reaction process. Since the temperature of the pipette tip is maintained by the second preset temperature at the time of detection of the distal end position of the pipette tip and during the reaction process, the distal end position of the pipette tip during the reaction process can be accurately detected before the reaction process. Further, since there is a period of heating the pipette tip by the first preset temperature that is higher than the second preset temperature, the temperature can converge early after switching to the second preset temperature. Therefore, it is possible to detect the distal end position of the pipette tip shortly after the attachment of the pipette tip or the start of heating by the heater.

In this way, the distal end position of the pipette tip during the reaction process can be detected accurately and quickly before the reaction process.

DESCRIPTION OF EMBODIMENTS

Hereinafter, an embodiment of the present invention will be described in detail with reference to the accompanying drawings. A reaction method according to an embodiment of the present invention includes a reaction process of supplying and removing a liquid to and from a reaction site multiple times by using a pipette tip for drawing and ejecting a liquid attached to a pipette nozzle, so as to allow two or more substances to cause a reaction.

(Overview of Apparatus Configuration)

Figure 1:
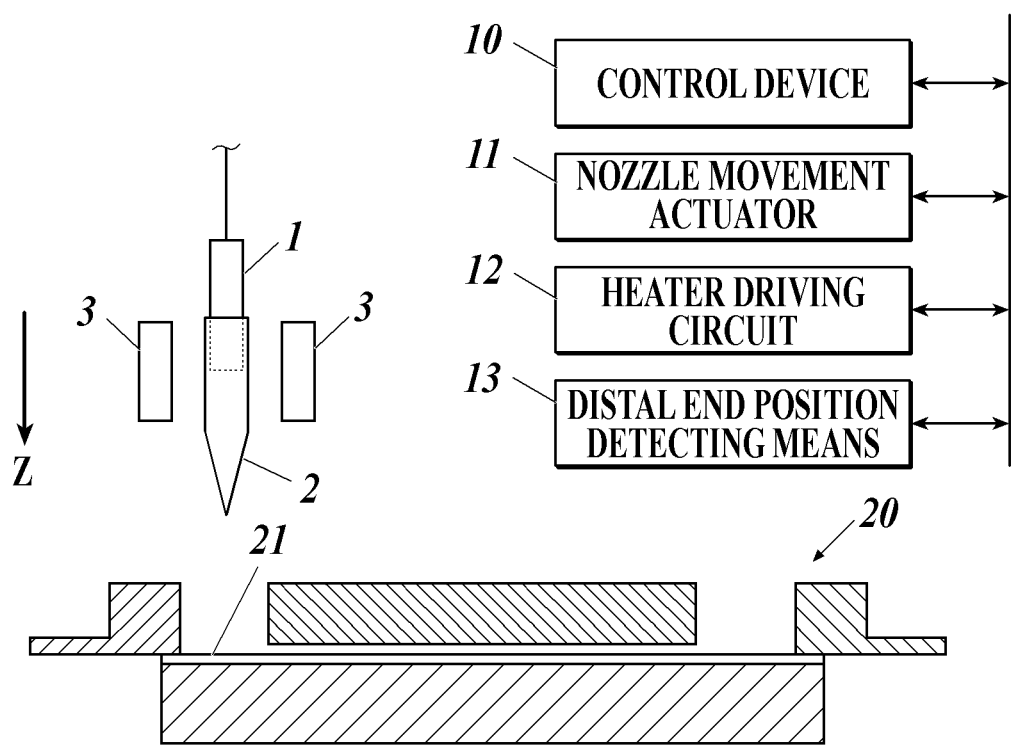
FIG. 1 is a schematic diagram showing an overview of an apparatus for performing the reaction method of the present invention.

As shown in FIG. 1, a pipette tip 2 is attached to a tip portion of a pipette nozzle 1. The heater 3 is disposed close to the attaching position of the pipette tip 2 ahead of the tip of the pipette nozzle 1. The heater 3 is configured to heat the pipette tip 2 attached to the pipette nozzle 1.

The control device 10 controls the operation of an analyzer that performs the reaction method of the present embodiment. With regard to the present invention, the control device 10 controls movement in the axial direction Z of the pipette nozzle 1 by the nozzle movement actuator 11, so as to control the level of the distal end of the pipette tip 2 with respect to the bottom surface 21 of a flow path of a detection chip 20. Further, the control device 10 controls the output of the heater 3 via the heater driving circuit 12. Further, the control device 10 controls a distal end position detecting means 13 to detect the distal end position in the axial direction Z of the pipette tip 2, so as to obtain the Z-coordinate thereof. The distal end position detecting means 13 may be constituted by an optical sensor as described in Patent Document 1 or may be configured to measure the air pressure from the pipette tip 2 as described in Patent Document 2. The present invention is not limited with regard to the means or method for detecting the distal end position of the pipette tip 2.

The linear expansion coefficient of the pipette tip 2 depends on the material of the pipette tip 2. The pipette tip 2 is preferably made of resin since such pipette tips can be produced readily at low cost. When the pipette chip 2 is made of polypropylene, the linear expansion coefficient thereof ranges roughly from $5.8 \times 10^{-5}$ to $12 \times 10^{-5}/°$ C. When the pipette chip A is made of polystyrene, the linear expansion coefficients thereof ranges roughly from $6.0 \times 10^{-5}$ to $8.0 \times 10^{-5}/°$ C. When the pipette chip A is made of polyethylene, the linear expansion coefficient ranges roughly from $11 \times 10^{-5}$ to $15 \times 10^{-5}/°$ C. When the pipette chip 2 is made of low-density polyethylene, the line expansion coefficient thereof ranges roughly from is $16 \times 10^{-5}$ to $20 \times 10^{-5}/°$ C. Further, when the pipette chip 2 is made of fluororesin, the linear expansion coefficient thereof ranges roughly from $10 \times 10^{-5}$ to $12 \times 10^{-5}/°$ C.

The control device 10 and the heater driving circuit 12 are configured to drive the heater 3 at a first preset temperature or a second preset temperature. The second preset temperature, which is used during the reaction process, is determined according to the type of the reaction. The first preset temperature is used for preheating. The first preset temperature is higher than the second preset temperature.

(Steps of Reaction Method)

Figure 2:
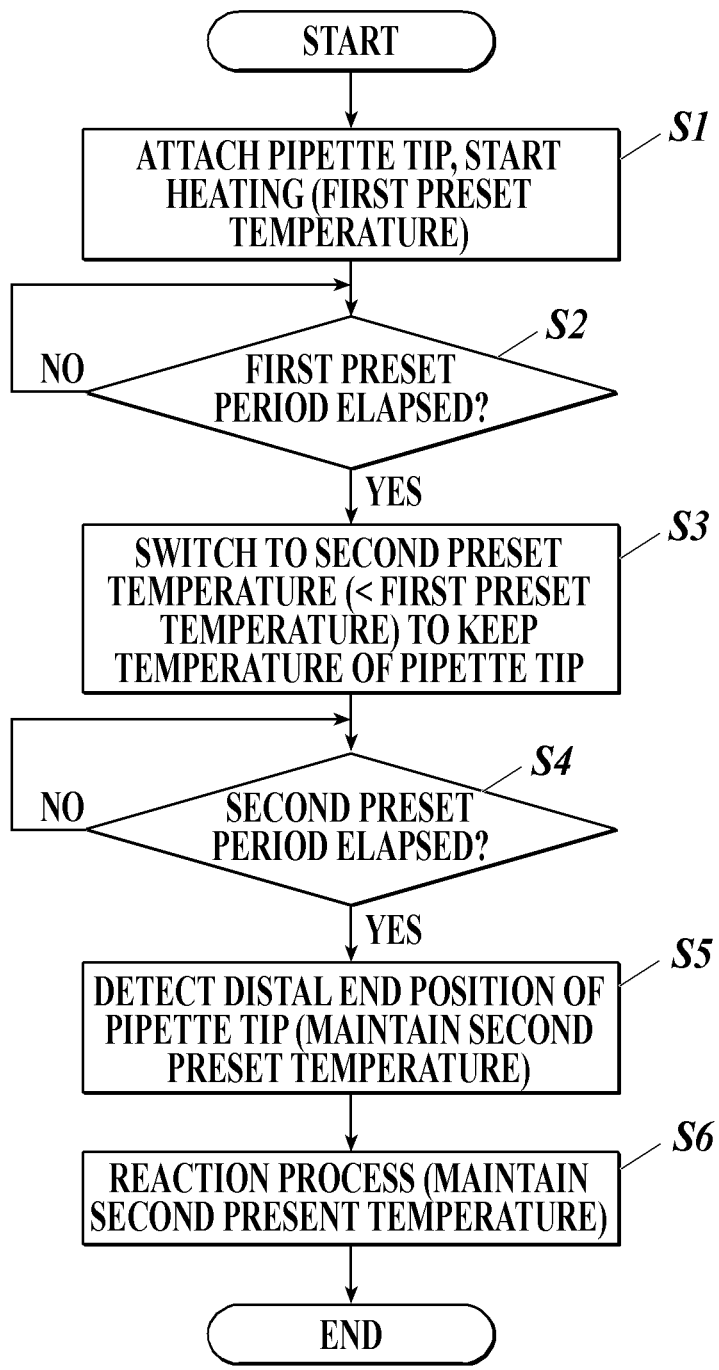
FIG. 2 is a flowchart showing control steps of the control device, which are the steps of the reaction method of the present invention.

Next, the steps of the reaction method of the present embodiment will be described referring to the flowchart of FIG. 2. The following steps are performed under the control of the control device 10.

First, the pipette tip 2 is attached to the pipette nozzle 1. As early as this step, the output of the heater 3 is adjusted to the first preset temperature. This is because the method can proceed to a reaction process in a short time.

That is, at the same time with attachment of the pipette tip 2 to the pipette nozzle 1, the pipette tip 2 starts to be heated by the first preset temperature of the heater 3 (Step S1).

When the heating time of the pipette tip 2 by the first preset temperature exceeds a first preset period (Yes in Step S2), the output of the heater 3 is switched to the second preset temperature so that the temperature of the pipette tip is kept by the second preset temperature (Step S3). The output of the heater 3 is maintained at a second preset temperature.

Next, the distal end position of the pipette tip 2 is detected by the distal end position detecting means 13 at or after switching to the second preset temperature. In the embodiment, a second preset period starts from the time of switching to the second preset temperature. That is, when the second preset period has elapsed (Yes in Step S4), the distal end position of the pipette tip 2 is detected by the distal end position detecting means 13. If the second preset period is 0, the distal end position of the pipette tip 2 is detected at the time of switching to the second preset temperature. If the second preset period is 10 s, the distal end position of the pipette tip 2 is detected 10 s after switching to the second preset temperature.

Next, with reference to the distal end position detected in step S5, the nozzle movement actuator 11 is controlled to control the movement of the pipette nozzle 1 in the axial direction so as to control the distal end position of the pipette tip 2 while the reaction process is executed (Step S6). In the reaction process, a liquid is ejected through the distal end opening of the pipette tip 2 to the detection chip 20, or a liquid is drawn from the detection chip 20 through the distal end opening of the pipette tip 2. In such ejection and draw, the level of the distal end of the pipette tip 2 with respect to the bottom surface 21 of the flow path of the detection chip 20 is suitably controlled with reference to the distal end position detected in Step S5 so that the ejection and draw are correctly performed.

After switching to the second preset temperature in Step S3, the output is maintained at the second preset temperature until this point. However, it is only necessary to continue heating the pipette tip 2 by the second preset temperature of the heater 3 at least until an operation using the pipette tip 2 in the reaction process. This is because it is not necessary to heat the pipette tip 2 any more after the operation using the pipette tip 2 is completed.

For example, the first preset temperature is 10° C. to 15° C. higher than the second preset temperature, the first preset period is from 5 s to 10 s, and the second preset temperature is from 10 s to 20 s.

(Demonstration Experiment)

FIG. 3 to FIG. 14 are graphs showing the change of the distal end position of the pipette tip 2 in the axial Z direction over time. FIG. 3 to FIG. 8 represent comparative examples, and FIG. 9 to FIG. 14 represent inventive examples. However, instead of executing the reaction process and detecting the distal end for the reference in the reaction process, the distal end of the pipette tip 2 was detected at regular time intervals.

N1, N2 and N3 in the graphs represent different samples of the pipette tip 2.

In the comparative examples, the heater 3 is maintained at a constant preset temperature. In the comparative examples, the point when the pipette tip 2 is attached to the pipette nozzle 1, that is, the point when the heating by the heater 3 is started, is represented by "0" on the time axis, which is the horizontal axis of each graph.

In the inventive examples, the output of the heater 3 is changed from the first preset temperature to the second preset temperature. In the inventive examples, the point of switching to the second preset temperature is represented by "0" on the time axis, which is the horizontal axis of each graph.

Detailed conditions of each example are as follows.

Figure 3:
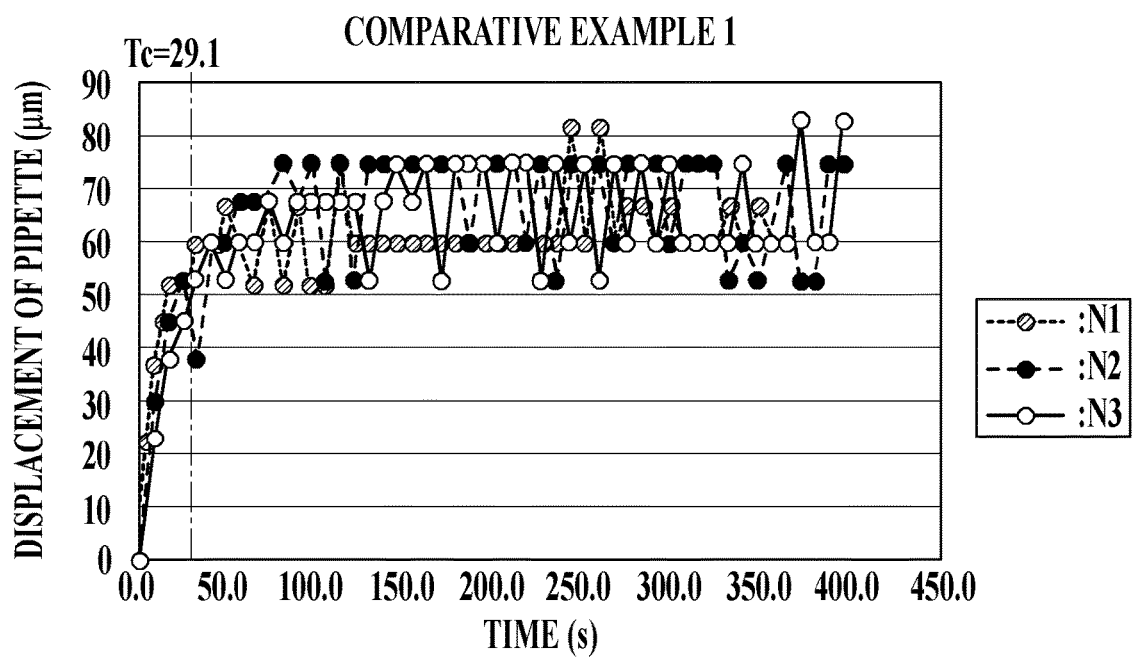
FIG. 3 is a graph illustrating the change of the distal end position of a pipette tip over time in Comparative Example 1.

In Comparative Example 1 shown in FIG. 3, the preset temperature is 40° C., and the ambient temperature is 10° C.

Figure 4:
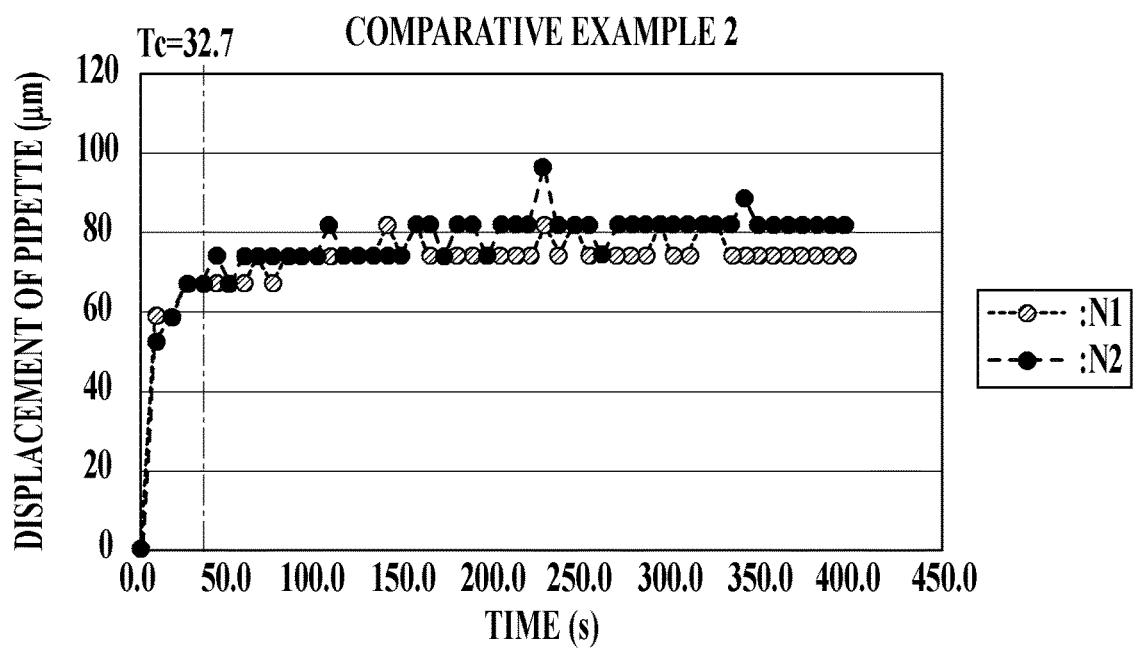
FIG. 4 is a graph illustrating the change of the distal end position of a pipette tip over time in Comparative Example 2.

In Comparative Example 2 shown in FIG. 4, the preset temperature is 40° C., and the ambient temperature is 23° C.

Figure 5:
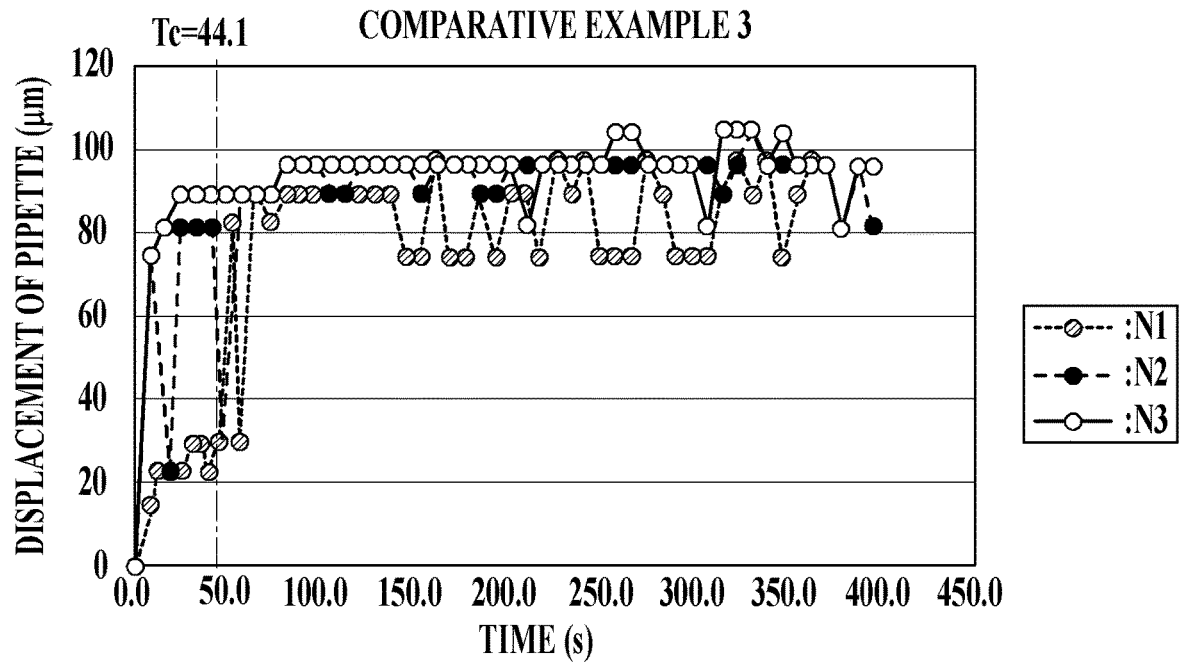
FIG. 5 is a graph illustrating the change of the distal end position of a pipette tip over time in Comparative Example 3.

In Comparative Example 3 shown in FIG. 5, the preset temperature is 40° C., and the ambient temperature is 30° C.

Figure 6:
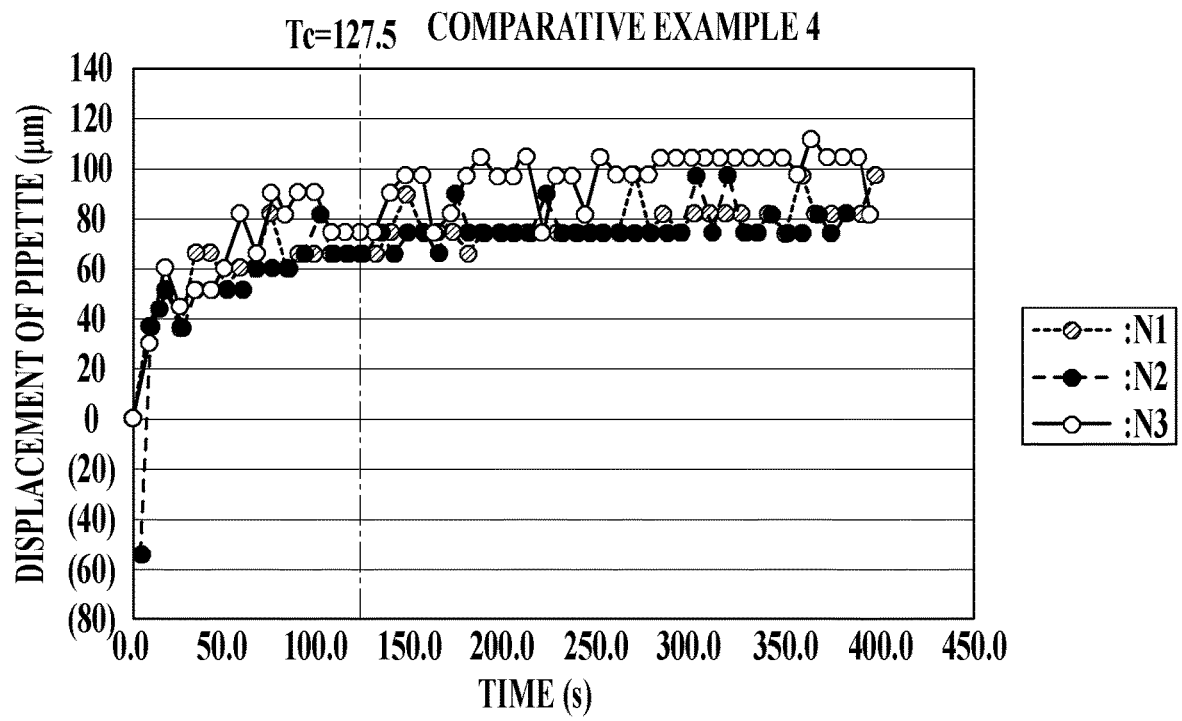
FIG. 6 is a graph illustrating the change of the distal end position of a pipette tip over time in Comparative Example 4.

In Comparative Example 4 shown in FIG. 6, the preset temperature is 45° C., and the ambient temperature is 10° C.

Figure 7:
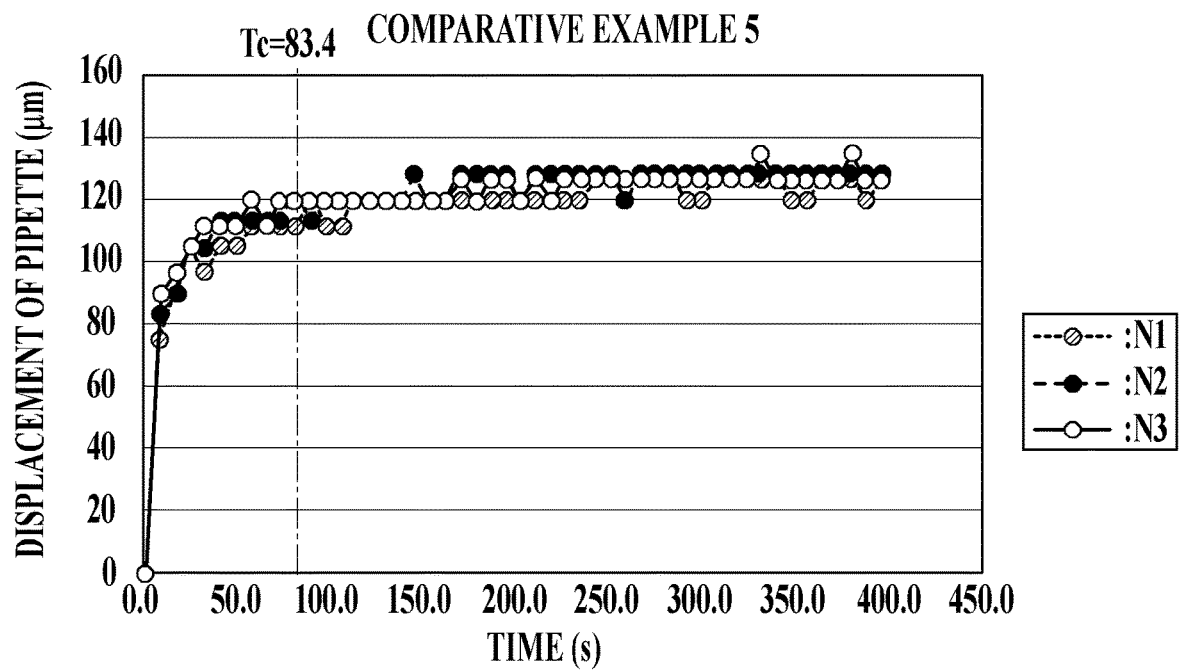
FIG. 7 is a graph illustrating the change of the distal end position of a pipette tip over time in Comparative Example 5.

In Comparative Example 5 shown in FIG. 7, the preset temperature is 45° C., and the ambient temperature is 23° C.

Figure 8:
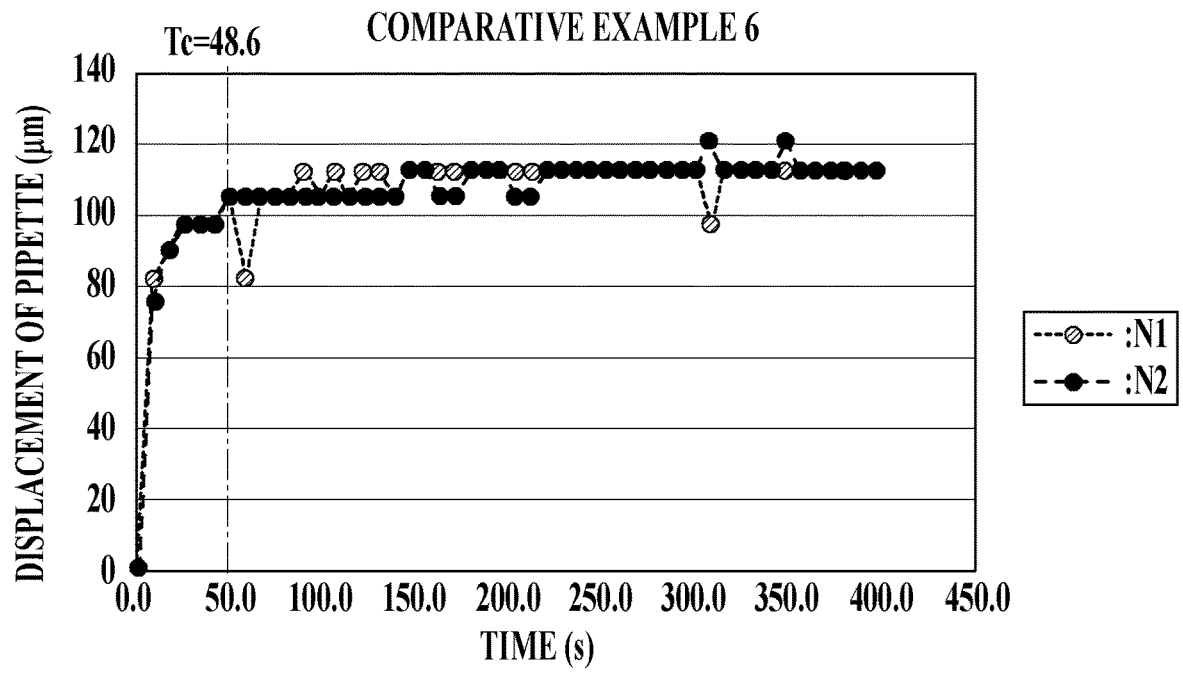
FIG. 8 is a graph illustrating the change of the distal end position of a pipette tip over time in Comparative Example 6.
Figure 9:
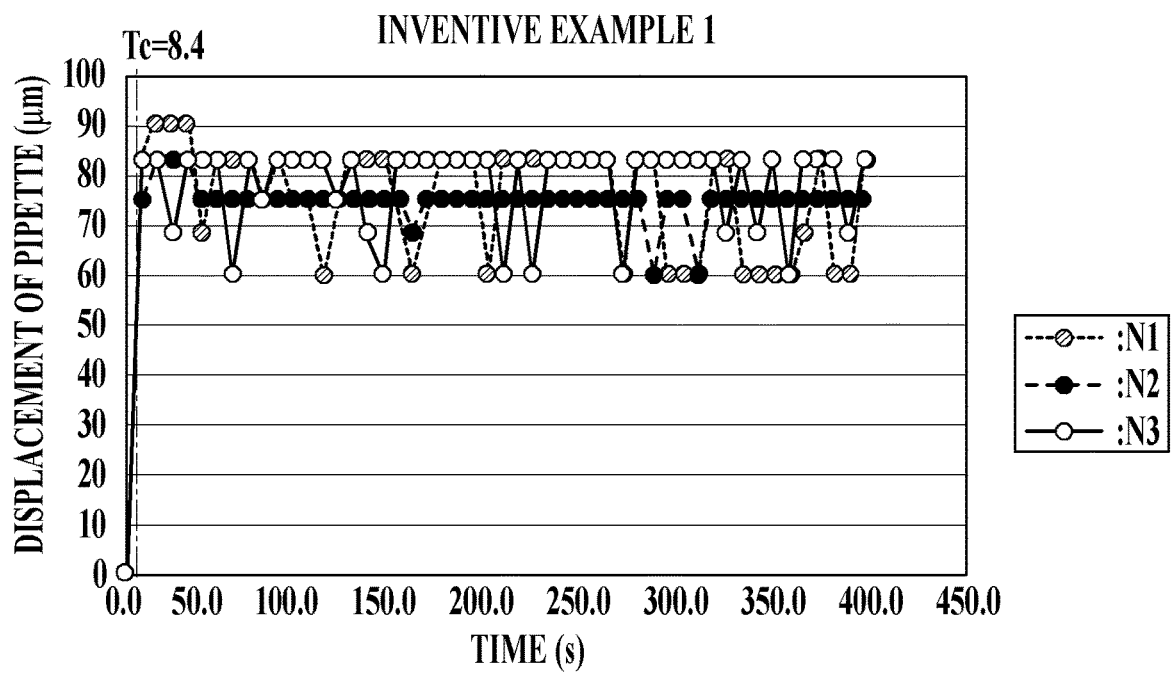
FIG. 9 is a graph illustrating the change of the distal end position of a pipette tip over time in Inventive Example 1.

In Comparative Example 6 shown in FIG. 8, the preset temperature is 45° C., and the ambient temperature is 30° C.[0026] In Inventive Example 1 shown in FIG. 9, the first preset temperature is 50° C., the first preset period is 5 s, the second preset temperature is 40° C., and the ambient temperature is 10° C.

Figure 10:
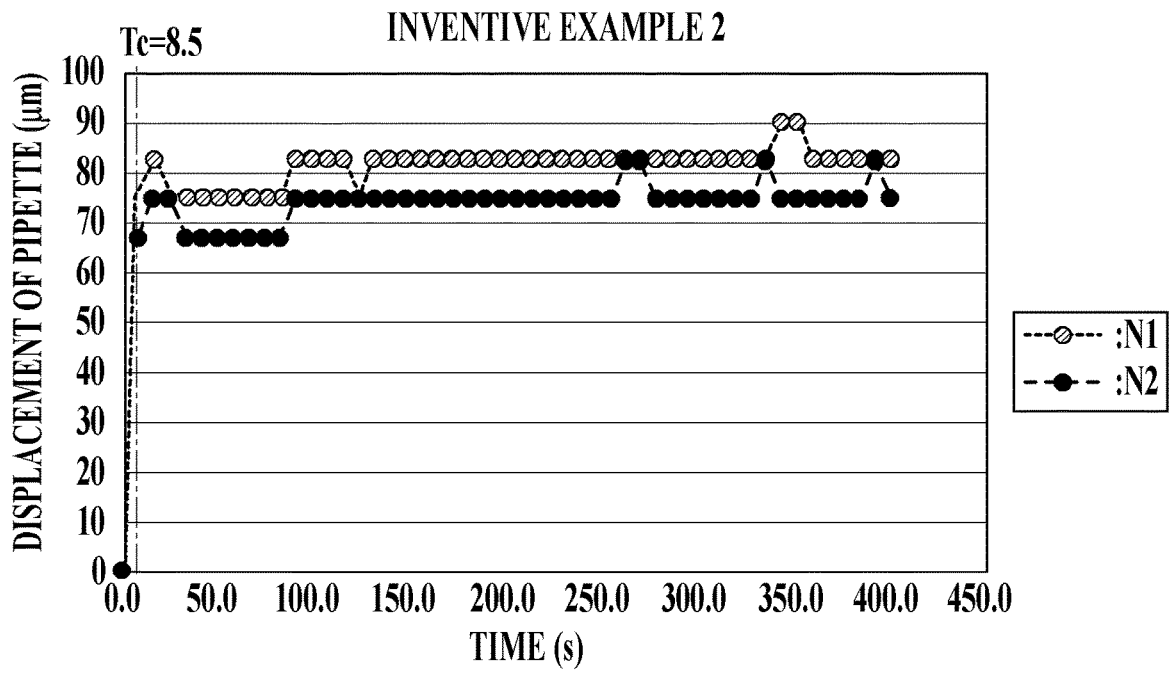
FIG. 10 is a graph illustrating the change of the distal end position of a pipette tip over time in Inventive Example 2.

In Inventive Example 2 shown in FIG. 10, the first preset temperature is 50° C., the first preset period is 5 s, the second preset temperature is 40° C., and the ambient temperature is 23° C.

Figure 11:
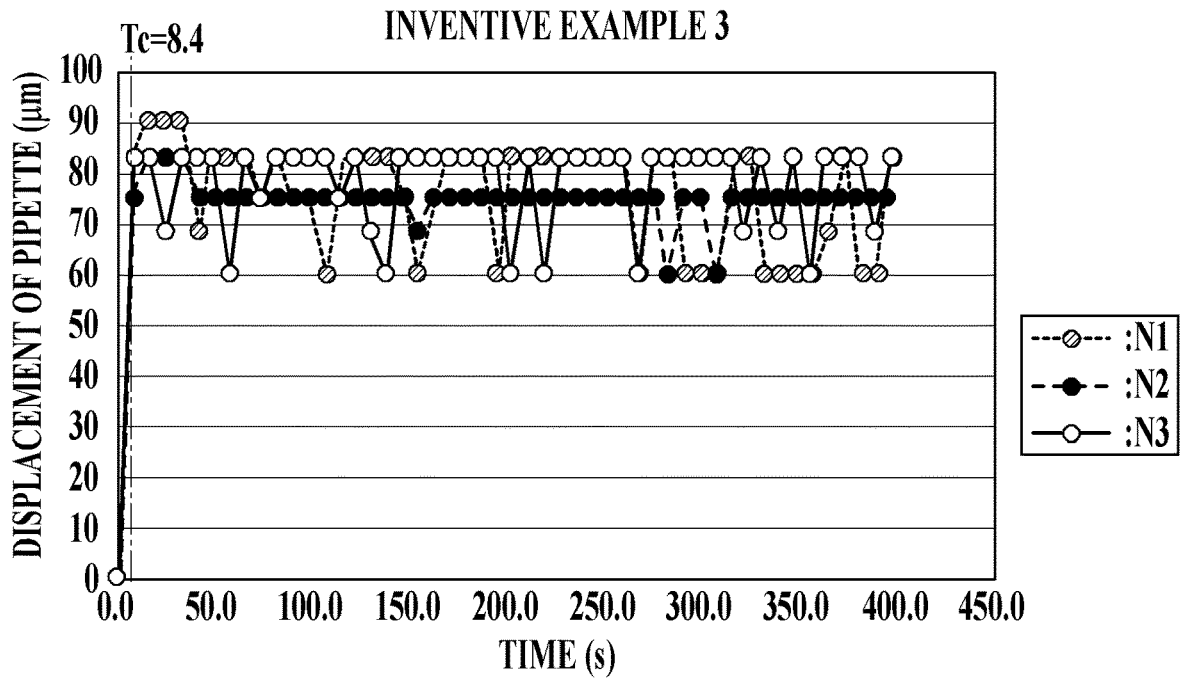
FIG. 11 is a graph illustrating the change of the distal end position of a pipette tip over time in Inventive Example 3.

In Inventive Example 3 shown in FIG. 11, the first preset temperature is 50° C., the first preset period is 5 s, the second preset temperature is 40° C., and the ambient temperature is 30° C.

Figure 12:
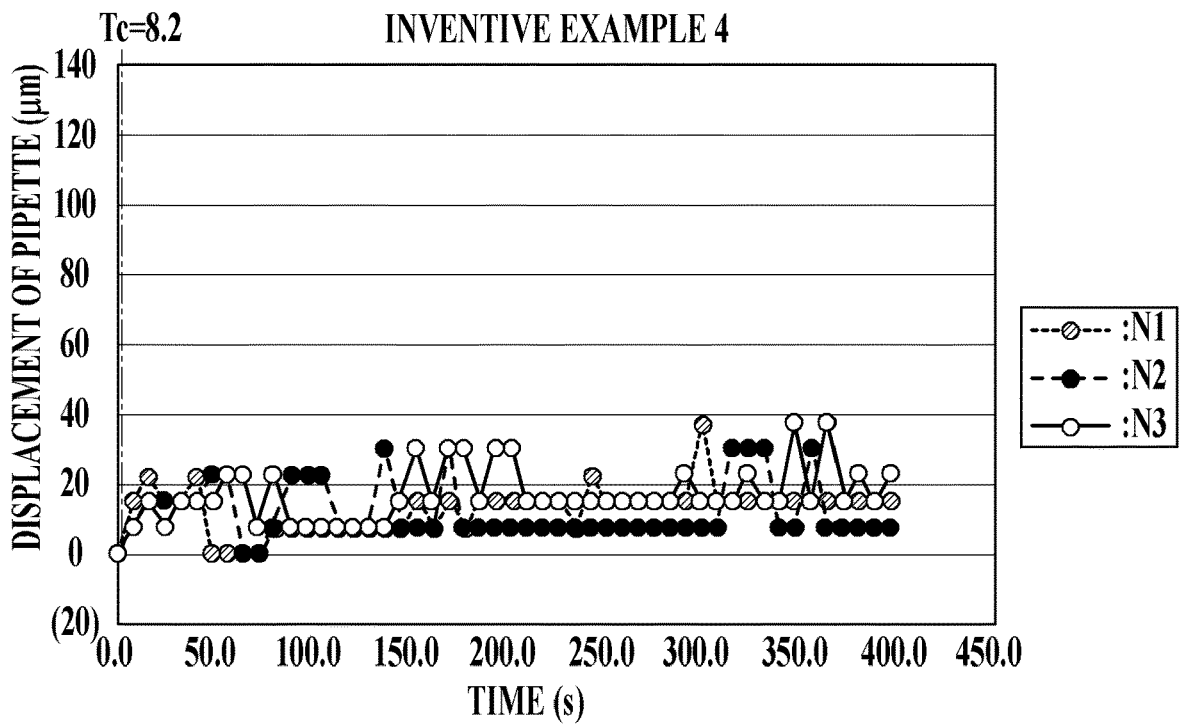
FIG. 12 is a graph illustrating the change of the distal end position of a pipette tip over time in Inventive Example 4.

In Inventive Example 4 shown in FIG. 12, the first preset temperature is 50° C., the first preset period is 10 s, the second preset temperature is 40° C., and the ambient temperature is 10° C.

Figure 13:
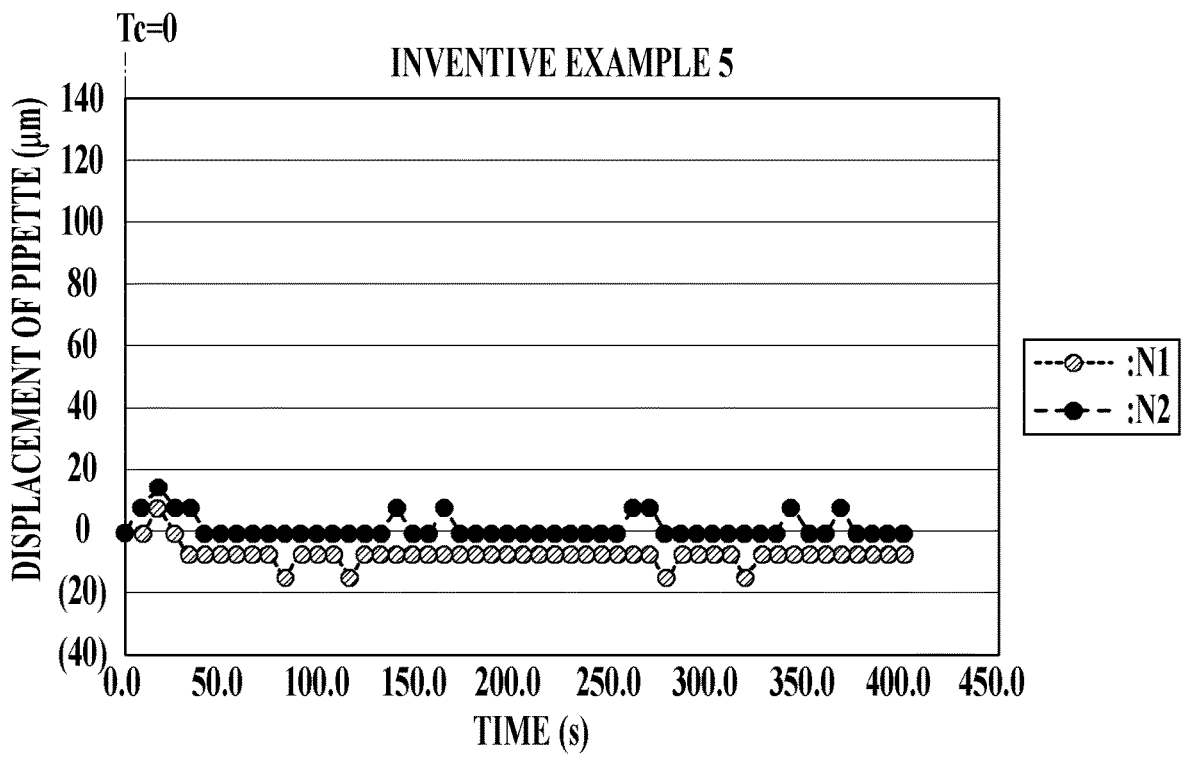
FIG. 13 is a graph illustrating the change of the distal end position of a pipette tip over time in Inventive Example 5.

In Inventive Example 5 in FIG. 13, the first preset temperature is 50° C., the first preset period is 10 s, the second preset temperature is 40° C., and the ambient temperature is 23° C.

Figure 14:
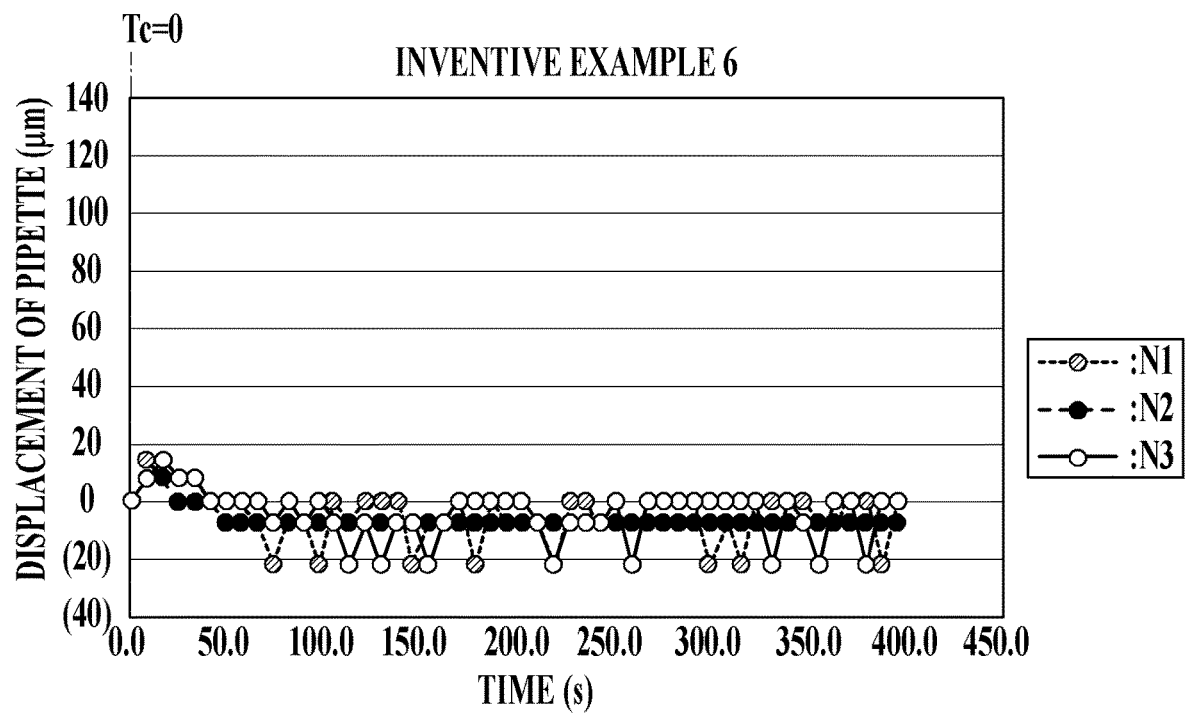
FIG. 14 is a graph illustrating the change of the distal end position of a pipette tip over time in Inventive Example 6.

In Inventive Example 6 shown in FIG. 14, the first preset temperature is 50° C., the first preset period is 10 s, the second preset temperature is 40° C., and the ambient temperature is 30° C.

As seen in the results in the graphs, the inventive examples converged to a certain variation range earlier than the comparative examples. This is further analyzed in detail as follows.

The point (Tc) when the variation converges within the range of a convergence point ±10 μm was calculated as the average of multiple samples and shown in each graph and table I. The convergence point was the average value of the data from the last 10 points. In Table I, values obtained by adding the first preset times are also shown for the inventive examples.

TABLE 1

|  | Convergence Time Tc (s) | First Preset Period (s) | Total Heating Time Until Convergence (s) |
| --- | --- | --- | --- |
| Comparative Example 1 | 29.1 | — | 29.1 |
| Comparative Example 2 | 32.7 | — | 32.7 |
| Comparative Example 3 | 44.1 | — | 44.1 |
| Comparative Example 4 | 127.5 | — | 127.5 |
| Comparative Example 5 | 83.4 | — | 83.4 |
| Comparative Example 6 | 48.6 | — | 48.6 |

TABLE 1-continued

|  | Convergence Time Tc (s) | First Preset Period (s) | Total Heating Time Until Convergence (s) |
|---|---|---|---|
| Inventive Example 1 | 8.4 | 5.0 | 13.4 |
| Inventive Example 2 | 8.5 | 5.0 | 13.5 |
| Inventive Example 3 | 8.4 | 5.0 | 13.4 |
| Inventive Example 4 | 8.2 | 10.0 | 18.2 |
| Inventive Example 5 | 0.0* | 10.0 | 10.0* |
| 1Inventive Example 6 | 0.0* | 10.0 | 10.0* |

Inventive Examples 5 and 6 might have been converged earlier since they were already in a converged state at the beginning of the period of data collection.

(Summary)

As shown in FIG. 1, FIG. 2, and FIG. 9 to FIG. 14, in the inventive examples, the temperature of the pipette tip is maintained by the second preset temperature at the time of detecting the distal end position of the pipette tip 2 and during the reaction process. Therefore, it is possible to accurately detect the distal end position of the pipette tip during the reaction process before the reaction process.

In addition, in the inventive examples, there is a period of heating the pipette tip 2 by the first preset temperature that is high than the second preset temperature. Therefore, the temperature can converge early after switching to the second preset temperature. Compared to Comparative Examples 1 to 6, it is possible to detect the distal end position of the pipette tip 2 shortly after the attachment of the pipette tip, or the start of heating by the heater. If the output were the second preset temperature (the preset temperature during the reaction process) from the time of attachment of the pipette tip 2, it would take a long time until the distal end position of the pipette tip 2 converges. In the present invention, a heating period at the first preset temperature is set as a high-temperature preheating period so that the pipette tip 2 is rapidly expanded to a convergence point under a thermal environment of the second preset temperature, whereby convergence can be achieved early. This allows earlier detection of the distal end position and proceeding to the reaction process.

According to the present embodiment as described above, it is possible to detect the distal end position of the pipette tip during the reaction process accurately and quickly before the reaction process.

INDUSTRIAL APPLICABILITY

The present invention is applicable to a reaction method for detecting a trace amount of a target substance such as a protein or a DNA quantitatively with high sensitivity.

REFERENCE SIGNS LIST

1 Pipette nozzle
2 Pipette tip
3 Heater
10 Control device
11 Nozzle movement actuator
12 Heater driving circuit
13 Distal end position detecting means
20 Detection chip
Tc Convergence time

The invention claimed is:

1. A reaction method that includes a reaction process of supplying and removing a liquid to and from a reaction site multiple times by using a pipette tip for drawing and ejecting a liquid attached to a pipette nozzle so as to allow two or more substances to cause a reaction, the method comprising:
   providing a heater for heating and keeping the pipette tip at a temperature in accordance with a preset temperature in a position that is close to an attaching position of the pipette tip ahead of a tip of the pipette nozzle;
   attaching the pipette tip to the pipette nozzle and heating the pipette tip by a first preset temperature by the heater;
   in response to determining that a period of heating the pipette tip by the first preset temperature exceeds a preset period, switching an output of the heater from the first preset temperature to a second preset temperature that is lower than the first preset temperature so as to keep a temperature of the pipette tip by the second preset temperature;
   detecting a distal end position of the pipette tip in an axial direction of the pipette nozzle at or after the switching to the second preset temperature; and
   executing the reaction process while controlling the distal end position of the pipette tip by controlling movement of the pipette nozzle in the axial direction with reference to the detected distal end position, in which the temperature of the pipette tip is kept by the second preset temperature by the heater at least until operation of the pipette tip in the reaction process.

2. The reaction method according to claim 1 wherein the pipette tip is made of a resin, and a linear expansion coefficient of the pipette tip is equal to or greater than $5.8 \times 10^{-5}$/° C.

3. The reaction method according to claim 1, wherein the first preset temperature is 10° C. to 15° C. higher than the second preset temperature.

4. The reaction method according to claim 1, wherein the preset period is from 5 s to 10 s.

5. The reaction method according to claim 1, wherein the distal end position of the pipette tip is detected 10 s to 20 s after the switching to the second preset temperature, and the reaction process is executed while controlling the distal end position of the pipette tip by controlling movement of the pipette nozzle with reference to the detected distal end position.

* * * * *